W. M. HEINEY.
EDUCATIONAL AND AMUSEMENT DEVICE.
APPLICATION FILED MAY 22, 1912.

1,053,598.   Patented Feb. 18, 1913.

WITNESSES

INVENTOR
William M. Heiney
by Henry N. Copp
his Attorney ic
UNITED STATES PATENT OFFICE.

WILLIAM M. HEINEY, OF FORT LAUDERDALE, FLORIDA.

EDUCATIONAL AND AMUSEMENT DEVICE.

1,053,598.  Specification of Letters Patent.  Patented Feb. 18, 1913.

Application filed May 22, 1912. Serial No. 698,929.

*To all whom it may concern:*

Be it known that I, WILLIAM M. HEINEY, a citizen of the United States, residing at Fort Lauderdale, county of Dade, and State of Florida, have invented certain new and useful Improvements in Educational and Amusement Devices, of which the following is a specification.

This invention relates to educational and amusement devices.

My object is to provide a novel educational and amusement device particularly designed to entertain and instruct in matters pertaining to geography and the scenes and customs of different nations, and it consists of an inclosure of substantially spherical form having a map of the world on its interior, with means for the observation thereof from the center of the hollow sphere; further, in the provision of an inclosure of the character set forth combined with a carrier for passengers adapted to be raised and lowered axially thereof and, preferably, adapted to be rotated at will while being raised or lowered so that all portions of the interior of the hollow sphere may be readily observed from the platform.

I prefer to arrange a hollow column within the hollow sphere, provide an entrance for persons at the bottom of the hollow axis, elevators within the hollow column, and a rotarily mounted passenger platform adapted to move up or down the column and to be rotated at will at any height. If desired, seats may be provided on the platform and room for offices, storage, and exhibitions arranged exteriorly of the hollow spherical inclosure or chamber.

Another feature of the invention is the provision of a hollow spherical inclosure or chamber having a map of the world on the interior thereof and means whereby such interior may be observed, together with movable sections of the wall of the hollow sphere and exterior staging whereby on moving one of said movable sections the staging may be exposed so that human actors may depict any desired scenes, preferably those representing customs, habits, or scenes associated with the particular country disposed at or adjacent to the point where the particular movable section is located.

The invention is set forth fully hereinafter and the novel features are recited in the appended claims.

Figure 1:
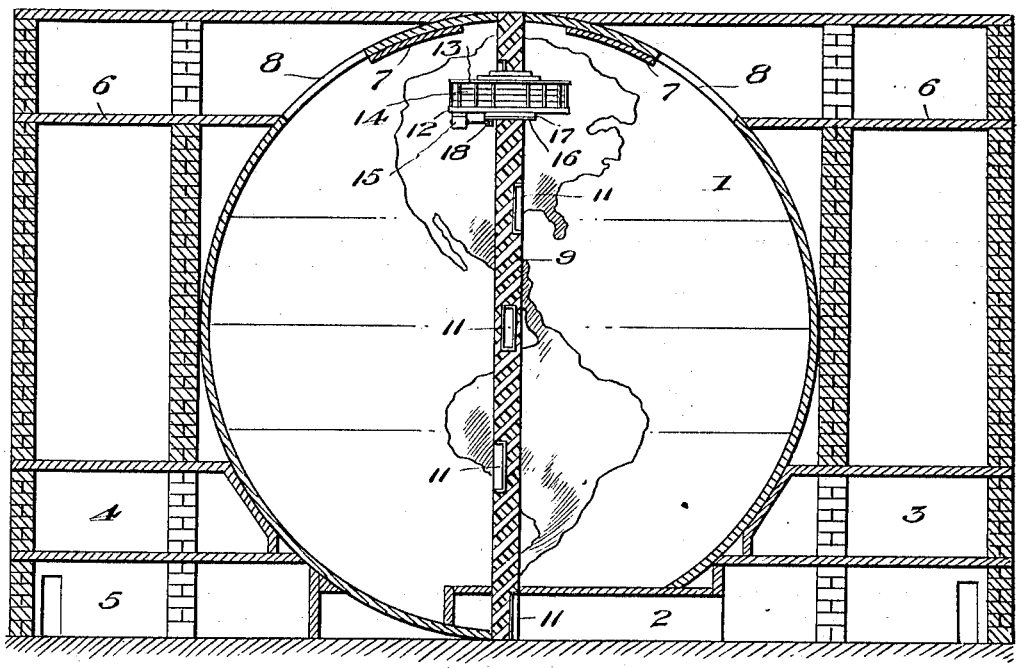
Figure 2:
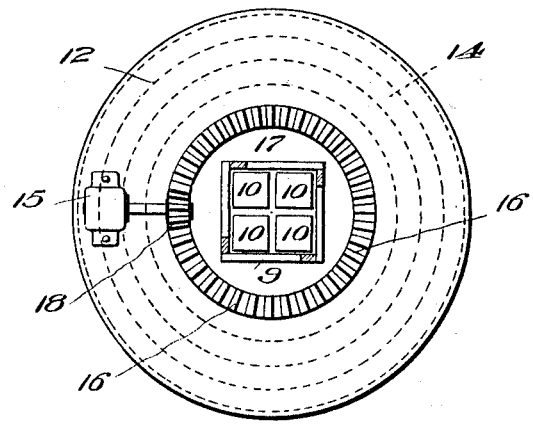

In the accompanying drawings:—Figure 1 is a vertical section of the invention; and Fig. 2, a horizontal section through the column, looking up toward the platform and showing the rotating means therefor.

1 represents a hollow substantially spherical inclosure, of relatively large diameter, say, one hundred to two hundred feet in diameter, and constructed of wood, pulp, steel, brick or concrete. The sphere has an entrance 2 by which persons may be admitted to its interior and it may be located inside of a building or grouped with offices, exhibition rooms, store rooms, or museums, etc., as shown at 3, 4, 5. At any suitable points vertically or horizontally of the sphere, exterior staging 6 is provided on which human actors may enact scenes or plays having to do with the customs, habits, or scenes of any particular country.

The interior of the sphere is provided with a map of the world which may be flat or in bas-relief, as preferred. Sections of the sphere 1 are movable and shifted up and down or laterally by any suitable means, as shown at 7, the same covering openings 8 which lead to the stage 6. Consequently, whenever one of the movable sections 7 is withdrawn, the stage 6 back of it is exposed to the view of the spectators within the sphere. These slidable sections and stages may be located as desired and, preferably, the actors may depict scenes or things associated with the particular country adjacent which, on the map of the world, the staging 6 may be located.

I may also provide screens of any kind on which moving pictures may be thrown, as a substitute for the slidable screens 7 and stages 6, or, for the use of moving pictures in connection with such stages. For instance, instead of having human actors appear on a given stage 6, the rear of the stage may be provided with a screen or the screen may be disposed against the wall of the sphere 1 and moving pictures may be thrown on the screen to illustrate subjects connected with any particular country.

Extending centrally and axially, preferably in a vertical position, is a square latticed metal column 9 within which elevators 10 of any construction and operated in any desired manner may travel up and down. Suitable openings 11 may be provided at any desired position to permit the discharge of passengers from the elevators direct on to a platform 12 from which the spectators view the interior of the sphere. The platform 12 is provided with a railing 13 and preferably with seats 14, enabling the spectators to remain seated or to walk around the platform as may be desired. Suitable means such as shown at 15 are provided for causing the platform to rotate as it travels up and down on the column 9. Different mechanical means may be employed to accomplish this purpose, but I have shown a gear track 16 on the platform support 17 and a motor driven pinion 18 on the platform. The platform is rotarily mounted on its support 17 and by starting and stopping the motor, the platform may be turned whenever desired. Any preferred means may be used for raising and lowering the platform. A hydraulic lift may be used or other means.

I do not limit myself to the precise construction set forth and lay claim to all modifications coming within the spirit and scope of the invention.

Having thus described my invention, what I claim as new, and desire to secure by Letters Patent, is:—

1. An amusement and educational device embodying a hollow sphere whose interior is provided with representations of things, an entrance to the interior of said sphere, and a rotatable passenger carrier movable axially within the sphere.

2. An amusement and educational device embodying a hollow sphere whose interior is provided with representations of things, an entrance to the interior of said sphere, a hollow axis for the sphere, a passenger or spectator carrier movable up and down on said axis, and an elevator operating within the hollow axis.

3. An amusement and educational device embodying a hollow sphere having sections of its interior movable in relation to the remaining surface thereof to cover or uncover parts of said surface, and spaces, normally covered by said movable sections, adapted for the display of scenes.

In testimony whereof, I hereunto affix my signature in presence of two witnesses.

WILLIAM M. HEINEY.

Witnesses:
SAML. L. DRAKE,
D. C. ALEXANDER.

Copies of this patent may be obtained for five cents each, by addressing the "Commissioner of Patents, Washington, D. C."